(12) United States Patent
Poh et al.

(10) Patent No.: US 11,407,506 B2
(45) Date of Patent: Aug. 9, 2022

(54) AIRPLANE WITH TANDEM ROTO-STABILIZERS

(71) Applicants: Chung Kiak Poh, Pulau Pinang (MY); Chung How Poh, Pulau Pinang (MY)

(72) Inventors: Chung Kiak Poh, Pulau Pinang (MY); Chung How Poh, Pulau Pinang (MY)

(*) Notice: Subject to any disclaimer, the term of this patent is extended or adjusted under 35 U.S.C. 154(b) by 167 days.

(21) Appl. No.: 16/798,336

(22) Filed: Feb. 22, 2020

(65) Prior Publication Data
US 2021/0245872 A1 Aug. 12, 2021

(51) Int. Cl.
*B64C 29/00* (2006.01)
*B64C 27/26* (2006.01)

(52) U.S. Cl.
CPC .......... *B64C 29/0025* (2013.01); *B64C 27/26* (2013.01)

(58) Field of Classification Search
CPC ............ B64C 29/0025; B64C 29/0016; B64C 29/0008
See application file for complete search history.

(56) References Cited

U.S. PATENT DOCUMENTS

| | | | | |
|---|---|---|---|---|
| 6,340,133 | B1* | 1/2002 | Capanna | B64C 29/0083 244/12.3 |
| 2010/0243820 | A1* | 9/2010 | Lim | B64C 27/26 244/7 A |
| 2016/0059958 | A1* | 3/2016 | Kvitnevskiy | B64C 27/08 701/3 |
| 2020/0269975 | A1* | 8/2020 | Fink | B64C 27/26 |
| 2020/0407055 | A1* | 12/2020 | Mores | B64C 39/08 |

* cited by examiner

*Primary Examiner* — Brian M O'Hara
(74) *Attorney, Agent, or Firm* — Daniel N. Smith

(57) ABSTRACT

The present invention relates to an airplane capable of hyper-short/vertical takeoff and landing (hyper-STOL/VTOL) and having non-rotatable vertical propulsions. It attempts to overcome a limitation of QuadPlane design by making efficient use of both horizontal and vertical propulsions during hovering and vertical flight.

16 Claims, 14 Drawing Sheets

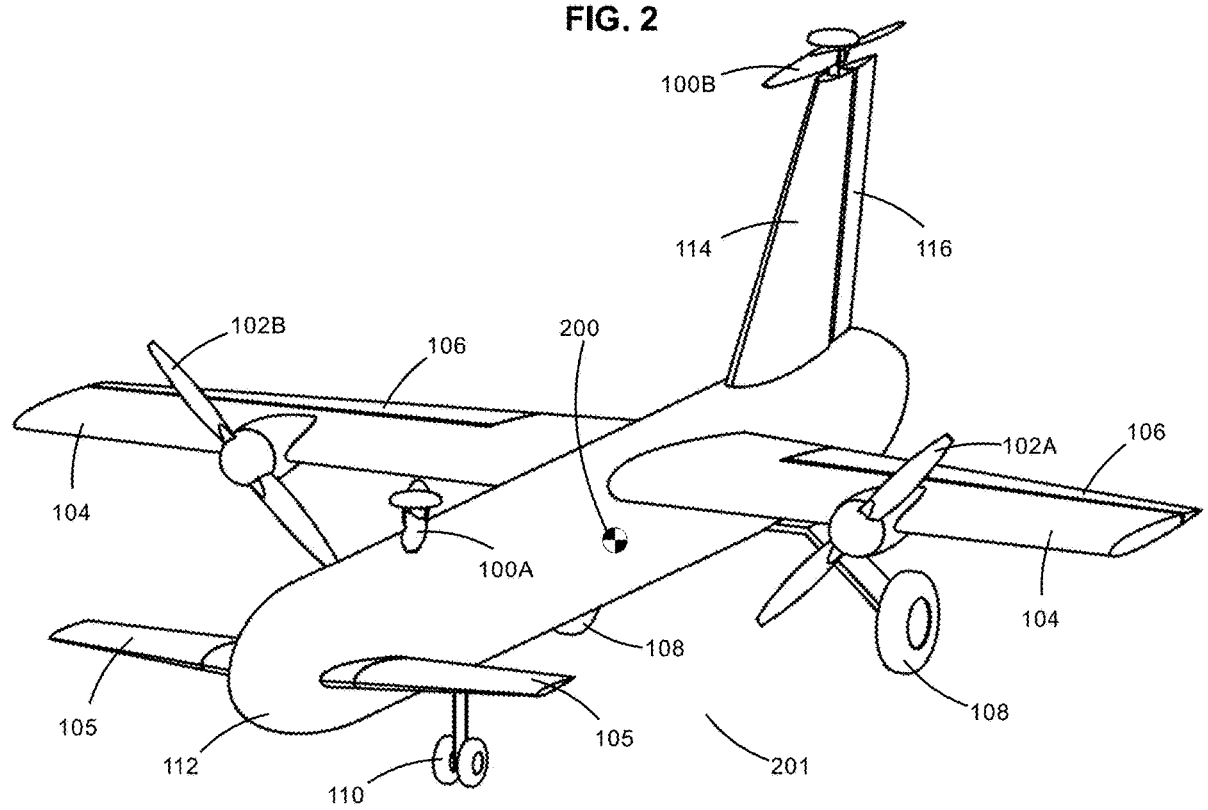

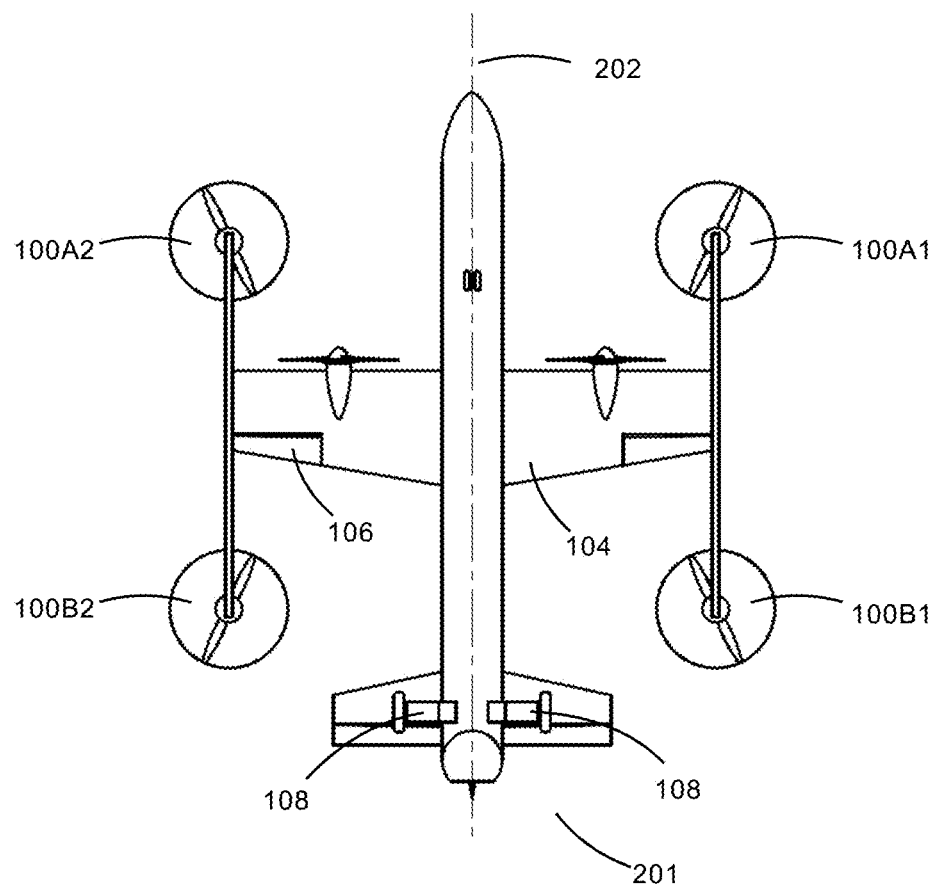

AIRPLANE WITH TANDEM ROTO-STABILIZERS

CROSS REFERENCE TO RELATED APPLICATION

This application claims priority to Malaysian Patent Application No. PI2020000674, filed on Feb. 6, 2020, the contents of which are incorporated herein by reference.

FIELD OF INVENTION

The present invention relates to a fixed-wing aircraft capable of hyper-short/vertical takeoff and landing (hyper-STOL/VTOL) with non-rotatable vertical propulsions.

BACKGROUND OF INVENTION

Personal aviation and aerial ridesharing such as Uber® Air are on the rise globally. In the words of Airborne, "OEMs and startups alike are racing the clock to launch the first electric vertical take-off and landing (eVTOL) aircraft by 2025" [Reference 1]. Many of the airframes used to realize eVTOL is largely based on that of a combined fixed wing and multicopter aircraft, also known as a "QuadPlane" [Reference 2]. This type of aircraft is known to have the benefit of vertical takeoff and landing, significantly higher cruising speed, and the ability to land vertically at the destination [Reference 2]. The design of a QuadPlane is built upon an airplane, but with an addition of at least 4 rotors/propellers for vertical flight [Reference 2]. In other words, there are separate propulsions for horizontal cruising flight and vertical flight. So in general, when a QuadPlane is hovering, its horizontal airplane-like propulsion(s) is/are inactive. Likewise, when said QuadPlane is cruising through the air using wing-borne lift in horizontal flight mode, its powerful helicopter-like vertical propulsions are inactive and having zero contribution. This, from our viewpoint, is inefficient and unoptimized. Other well-known airframe configurations that enable an airplane to hover and perform vertical flight are those based on tilt-wings and tilt-rotors involving rotatable propulsion units which often are technologically more complex than a QuadPlane [References 3,4].

The present invention thus proposes an airplane that has the hovering ability of a QuadPlane but incorporate innovative design that facilitates efficient use of both horizontal and vertical propulsions during a hover and vertical flight.

SUMMARY OF INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The present invention relates to an airplane capable of hyper-short/vertical takeoff and landing (hyper-STOL/VTOL) and with non-rotatable vertical propulsions. An object of the present invention is to overcome a limitation of QuadPlane design by making efficient use of both horizontal and vertical propulsions during hovering and vertical flight.

In our previous Malaysian Patent Application No. PI 2018500050, we proposed the concept of "roto-stabilizer" as an effective solution to overcome the limitations of conventional horizontal stabilizers in the post-stall regime and its primary function is to generate moment about the pitch axis of an airplane, even in stall/post-stall regime. The roto-stabilizer comprises a plurality of rotary wings (or collectively known as a rotor). Said rotor can be fixed-pitch or variable pitch. The trend in eVTOL is to opt for fixed-pitch approach given its mechanical simplicity. The axis of rotation of the rotor is substantially vertical and said rotor is driven by driving means such as an electric motor to generate aerodynamic thrust in a substantially vertical direction, making it possible to actuate pitch control of an airplane while it is stationary on the ground and having no forward airspeed. The "roto-stabilizer" has three primary configurations namely: tail-aft, "above CG" and canard (Malaysian Patent Application No. PI 2018500050).

The present invention may broadly be viewed as a combination of tail-aft and canard configurations of roto-stabilizer, resulting in ability to provide both vertical propulsion or rotor-borne lift and to generate pitching moment about the pitch axis of an airplane. The present invention may therefore be conveniently termed as "tandem roto-stabilizers" and we believed it will play a significant role in the future of personal aviation and aerial ridesharing.

Embodiments of the airplane in the present invention comprise at least two vertical propulsors which may be divided into fore unit(s) and aft unit(s), and at least a longitudinally oriented horizontal propulsor. Embodiments of the present invention may also comprise at least an aerodynamic surface for pitch stability and control during horizontal flight mode, and examples of which are horizontal stabilizer and V-tail, both of which will be exemplified by the various embodiments of the present invention described herein.

In general, each wing comprises at least an aileron for roll control. The airplane's forward thrust during cruising phase is provided by the horizontal propulsor(s). Furthermore, either the entire horizontal stabilizer may be used to actuate pitch control or the horizontal stabilizer can have elevators for aerodynamic pitch control depending on applications. The vertical propulsors are arranged such that the fore unit(s) is/are located on the front section of said airplane while the aft unit(s) is/are located on the back section of the airplane. During hovering and vertical flight the airplane assumes a nose-up attitude known as 'harrier' with positive pitch angle so that the horizontal propulsor(s) and the vertical propulsors both contribute to lift via resolution of vectors. Additionally, the horizontal propulsor(s) may be based on a variety of drives such as electric motor, internal combustion, solar engine, and turbine engine.

The subject invention discloses an aircraft capable of a substantially vertical takeoff and a substantially vertical landing with non-rotatable vertical propulsions, the aircraft comprising: a longitudinal axis; a center of gravity; an airframe comprising a front section and a back section; at least one fore vertical propulsor located on the front section of the airframe; at least one aft vertical propulsor located on the back section of the airframe, wherein the fore and aft vertical propulsors are in substantially lateral symmetrical positions about the longitudinal axis of the aircraft; at least one horizontal propulsor on the airframe; wherein said aircraft assumes a nose-up attitude with a positive pitch angle during hovering such that both the horizontal propulsor and the vertical propulsors are contributing to lift via resolution of thrust vectors.

In further embodiments of the invention, the airframe further comprises a pair of main wings, wherein at least one horizontal propulsor is attached to at least one main wing.

In additional embodiments of the invention, the airframe further comprises at least a pair of main wings, wherein the pair of main wings are in substantially lateral symmetrical positions about the longitudinal axis of the aircraft, further wherein each main wing comprises at least one aileron, wherein each aileron is immersed in strong propeller wash generated by the horizontal propulsor for roll control during hovering and vertical flight.

In other embodiments of the invention, the aircraft further comprises at least one aerodynamic surface for pitch stability and control during horizontal flight.

In embodiments of the invention, the aircraft comprises at least one set of main landing gears located behind the center of gravity of said aircraft, and at least one set of nose gears.

In further embodiments of the invention, the airframe further comprises: at least a pair of main wings, wherein the pair of main wings are in substantially lateral symmetrical positions about the longitudinal axis of the aircraft, further wherein at least one horizontal propulsor is mounted proximate to leading edges of the main wings.

In additional embodiments of the invention, the aircraft further comprises at least one aerodynamic surface for pitch stability and control during horizontal flight, wherein the aerodynamic surface is a horizontal stabilizer.

In other embodiments of the invention, the aircraft further comprises at least one aerodynamic surface for pitch stability and control during horizontal flight, wherein the aerodynamic surface is a V-tail.

In further embodiments of the invention, the aircraft comprises at least one set of main landing gears located behind the center of gravity of said aircraft, wherein the set of main gears is placed substantially in line with the aft unit vertical propulsor.

In embodiments of the invention, the aircraft comprises at least one set of main landing gears located behind the center of gravity of said aircraft, wherein the set of main gears is located behind the aft unit vertical propulsor.

In other embodiments of the invention, the aircraft comprises at least one vertical stabilizer.

In additional embodiments of the invention, the aircraft comprises at least one vertical stabilizer, wherein at least one aft vertical propulsor is attached to the top of the vertical stabilizer.

In further embodiments of the invention, the aircraft comprises at least one vertical stabilizer, wherein the vertical stabilizer further comprises a rudder.

In embodiments of the invention, the airframe of said aircraft comprises at least a fuselage.

The subject invention also discloses a method for achieving substantially vertical takeoff, substantially horizontal flight, and substantially vertical landing for an aircraft with non-rotatable vertical propulsions, comprising: (a) powering up at least one fore vertical propulsor, at least one aft vertical propulsor, and at least one horizontal propulsor located on an airframe of the aircraft; (b) ramping up output thrusts of the fore and aft vertical propulsors; (c) ramping up an output thrust of horizontal propulsor to compensate for the effects of headwind; (d) raising a pitch angle of the aircraft by differential thrust provided by the vertical propulsors while simultaneously adjusting the output thrusts of both the vertical propulsors and the horizontal propulsor, such that a resultant thrust vector is substantially pointing in a vertical direction; (e) increasing the resultant thrust vector to cause the aircraft to lift off the ground and enter a vertical flight mode; (f) lowering the pitch angle of the aircraft to initiate a forward flight mode; (g) increasing the pitch angle of the aircraft and increasing vertical lift provided by the vertical propulsors to transition from forward flight mode to a vertical landing mode, until the pitch angle has reached a value wherein a net horizontal force component is substantially zero and a resultant thrust vector is pointing in a substantially vertical direction; (h) reducing output power to both the vertical propulsors and the horizontal propulsor to initiate vertical descent; and (i) decreasing the pitch angle towards zero degree by using differential thrust of the vertical propulsors until a set of main gears is in contact with the ground and the aircraft has landed.

The subject invention further discloses a method for achieving substantially vertical takeoff, substantially horizontal flight, and substantially vertical landing for an aircraft with non-rotatable vertical propulsions, comprising: (a) powering up at least one fore vertical propulsor, at least one aft vertical propulsor, and at least two horizontal propulsors located on pair of main wings attached to an airframe of the aircraft; (b) ramping up output thrusts of the fore and aft vertical propulsors; (c) ramping up an output thrust of horizontal propulsors to compensate for the effects of headwind; (d) raising a pitch angle of the aircraft by differential thrust provided by the vertical propulsors while simultaneously adjusting the output thrusts of both the vertical propulsors and the horizontal propulsors, such that a resultant thrust vector is substantially pointing in a vertical direction; (e) increasing the resultant thrust vector to cause the aircraft to lift off the ground and enter a vertical flight mode; (f) lowering the pitch angle of the aircraft to initiate a forward flight mode; (g) increasing the pitch angle of the aircraft and increasing vertical lift provided by the vertical propulsors to transition from forward flight mode to a vertical landing mode, until the pitch angle has reached a value wherein a net horizontal force component is substantially zero and a resultant thrust vector is pointing in a substantially vertical direction; (h) reducing output power to both the vertical propulsors and the horizontal propulsors to initiate vertical descent; and (i) decreasing the pitch angle towards zero degree by using differential thrust of the vertical propulsors until a set of main gears is in contact with the ground and the aircraft has landed.

The subject invention additionally discloses an airplane capable of hyper-short vertical takeoff and landing (hyper-STOL/VTOL) with non-rotatable vertical propulsions comprising: a longitudinal axis; a center of gravity (C.G.); a front section, and a back section; at least two vertical propulsors, the vertical propulsors are arranged such that they exhibit more or less lateral symmetry about the longitudinal axis of the airplane, the vertical propulsors are further divided into fore unit(s) and aft unit(s), said vertical propulsors are arranged such that the fore unit(s) is/are located on the front section of said airplane while the aft unit(s) is/are located on the back section of the airplane; and at least a horizontal propulsor, wherein said airplane assumes a nose-up attitude with positive pitch angle during hovering such that both the horizontal propulsor(s) and the vertical propulsors are contributing to lift via resolution of vectors.

In further embodiments of the invention, the airplane comprises: at least a pair of main wings, wherein each main wing comprises at least an aileron, having at least one aileron immersed in strong propeller wash generated by the horizontal propulsors for roll control during hovering and vertical flight; and at least an aerodynamic surface for pitch stability and control during horizontal flight mode.

In additional embodiments of the invention, the airplane comprises: at least a set of main gears located behind the center of gravity of said airplane, and at least a nose gear.

In further embodiments of the invention, the horizontal propulsors are mounted close to the leading edges of the main wings.

In other embodiments of the invention, the aerodynamic surface is a horizontal stabilizer.

In additional embodiments of the invention, the aerodynamic surface is a V-tail.

In embodiments of the invention, at least a set of main gears is placed substantially in line with the aft unit(s) of the vertical propulsors.

In additional embodiments of the invention, at least a set of main gears is located behind the aft unit(s) of the vertical propulsors.

In other embodiments of the invention, the airplane comprises at least a vertical stabilizer.

In further embodiments of the invention, the vertical stabilizers further comprise rudders.

In embodiments of the invention, the airplane comprises at least a fuselage.

The subject invention also discloses a method for achieving vertical takeoff—forward flight—vertical landing sequence for the airplane comprising: (a) ramping up the output thrusts of the vertical propulsors, and ramping up the output thrust(s) of horizontal propulsor(s) to compensate for the effects of headwind; (b) raising the airplane's pitch angle by means of differential thrust provided by the vertical propulsors while simultaneously adjusting the output thrusts of both the vertical propulsors and the horizontal propulsor (s) such that the resultant vector is substantially pointing in a vertical direction; (c) further increasing the total rotor-borne lift to cause the airplane to lift off the ground and entering its vertical flight mode; (d) lowering the pitch angle of the airplane to initiate forward flight mode; (e) transitioning from forward flight mode to vertical landing: gradually increasing the pitch angle of the airplane and increasing rotor-borne lift provided by the vertical propulsors; (f) once the pitch angle has reached a value wherein net horizontal force component is substantially zero and resultant vector is pointing substantially vertical, reducing output power to both the vertical propulsors and the horizontal propulsor(s) to initiate vertical descent; (g) when at least a set of main gears is in contact with the ground, gradually decreasing pitch angle towards 0° by using differential thrust of the vertical propulsors.

In embodiments of the subject invention, the term "substantially" is defined as at least close to (and can include) a given value or state, as understood by a person of ordinary skill in the art. In one embodiment, the term "substantially" refers to ranges within 10%, preferably within 5%, more preferably within 1%, and most preferably within 0.1% of the given value or state being specified.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. These together with other objects of the invention, along with the various features of novelty, which characterize the invention, are pointed out with

BRIEF DESCRIPTION OF THE DRAWINGS

Advantages of the present invention will be apparent from the following detailed description of embodiments thereof, which description should be considered in conjunction with the accompanying drawings, in which:

FIG. 2 is a perspective view of an exemplary airplane comprising a horizontal stabilizer and vertical stabilizer.

FIG. 9b A bottom view of the airplane shown in FIG. 8a, wherein the vertical propulsors are positioned at a lateral distance away from the longitudinal axis of the airplane.

DETAILED DESCRIPTION OF THE EMBODIMENTS

While several variations of the present invention have been illustrated by way of example in particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Figure 1:
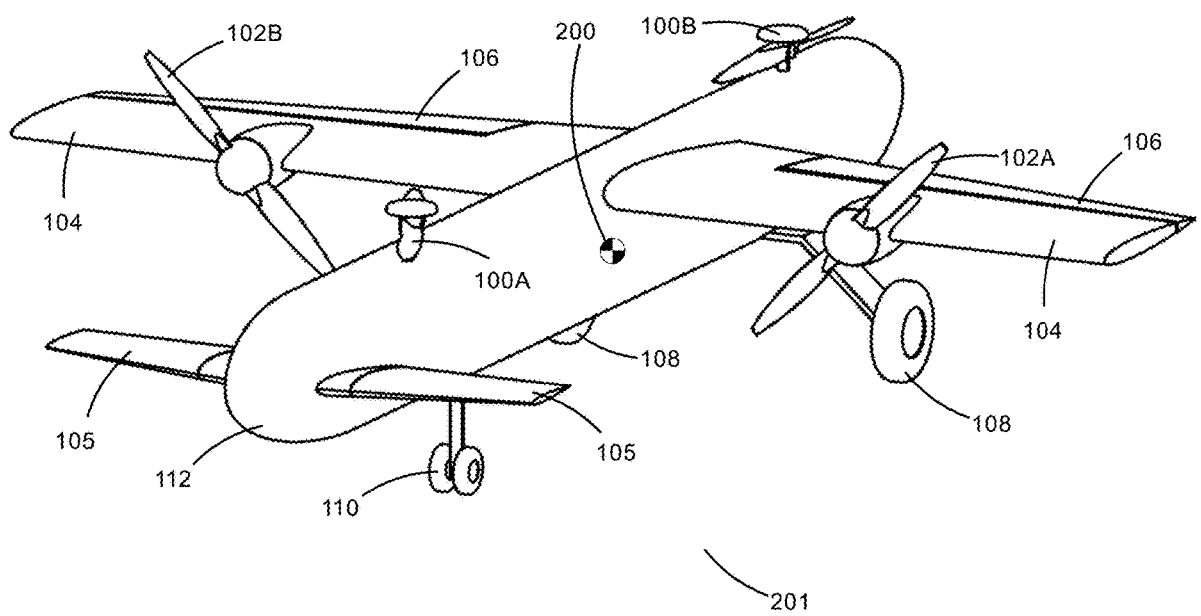
FIG. 1 is a perspective view of an exemplary airplane comprising two vertical propulsors (or roto-stabilizers) in accordance with the present invention.

The present invention relates to a fixed-wing aircraft (airplane 201) capable of hyper-short/vertical takeoff and landing ("hyper-STOL/VTOL") with non-rotatable vertical propulsions. Well-known examples of airplanes having rotatable vertical propulsions are tilt-wings and tilt-rotors. FIG. 1 shows a perspective view of a preferred embodiment of the airplane (201) in accordance with the present invention.

The exemplary airplane (201) comprises at least a pair of vertical propulsors (100A, 100B), at least a pair of horizontal propulsors (102A, 102B), at least a pair of main wings (104), and a horizontal stabilizer (105) in the form of canard. Each of the main wing (104) comprises at least an aileron (106) for roll control. Horizontal propulsors (102A, 102B) are mounted close to the leading edges of the respective main wings (104).

The vertical propulsors (100A, 100B) are arranged such that they exhibit more or less lateral symmetry about the longitudinal axis (202) of the airplane (201). Furthermore, the fore unit (100A) should be located on the front section of the airplane (201) and in front of the center of gravity (200) of said airplane (201), while the aft unit (100B) should be mounted on the back section of the airplane (201) and behind the center of gravity (200) of said airplane (201) as illustrated in FIG. 1. Each of the vertical propulsors (100A, 100B) may be viewed as a unit of roto-stabilizer. Both the vertical propulsors (100A, 100B) are preferably located at substantially equal distance from the center of gravity (200) for optimal pitch control performance. Furthermore, the tandem vertical propulsors (100A, 100B) in this example have counter-rotating rotors to cancel out the torque effect and the same principle may apply to the horizontal propulsors (102A, 102B).

The horizontal propulsors (102A, 102B) should be mounted in such a way that would enable said ailerons (106) to be exposed to strong air-stream generated by the horizontal propulsors (102A, 102B) to help ensure adequate roll control in deep wing-stall regimes such as hovering, vertical landing, and hyper-short takeoff. For this reason, the horizontal propulsors (102A, 102B) should be positioned in front of the ailerons (106) and in this particular example, they are mounted near the leading edges of the main wings (104). Yaw control during vertical flight mode may be realized using differential thrust of the horizontal propulsors (102A, 102B). A set of main landing gears (108) is located on the back section of the airplane (201), behind the center of gravity (200) of said airplane (201). Use of the horizontal stabilizer (105) for pitch control during cruising flight allows the vertical propulsors (100A, 100B) to be switched off thereby improving efficiency and extending range of travel.

Main landing gears (108) and nose gear (110) with wheels are useful for hyper-STOL and emergency landing involving ground roll on runway. Furthermore, this exemplary airplane (201) has a fuselage (112). Given the vertical takeoff and landing (VTOL) capability of the airplane (201), the main landing gears (108) and nose gear (110) may be equipped with floats for water operation or skis for operating from snow.

FIG. 2 shows a similar embodiment as in FIG. 1 except the airplane (201) comprises an optional vertical stabilizer (114) which is useful for directional stability during a glide or in case the horizontal propulsors (102A, 102B) are malfunctioning and differential thrust for yaw control is not available. It is possible to have more than one vertical stabilizer (114). The vertical stabilizer(s) (114) may further comprise rudder(s) (116), though simulation suggested that the airplane can still turn satisfactorily using only ailerons without use of rudder (116).

Figure 3A:
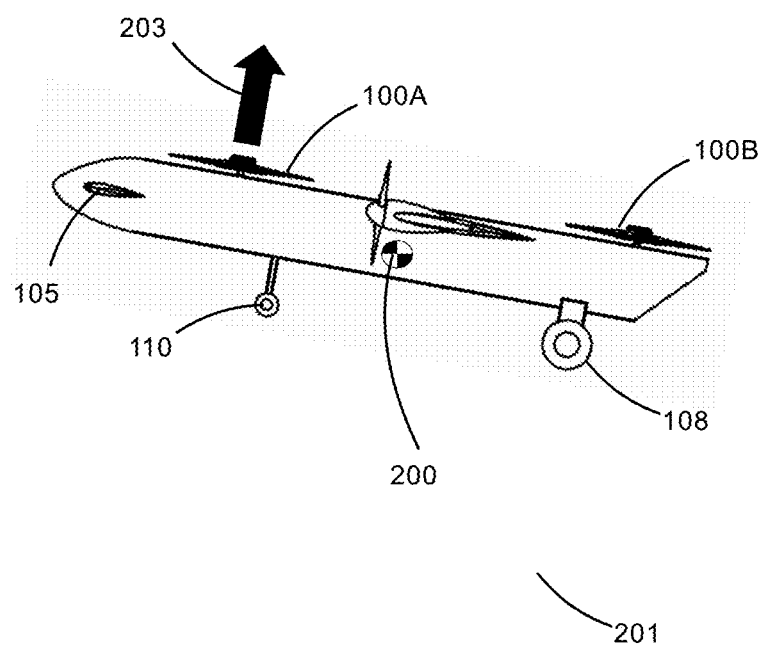
FIG. 3a is a side view showing the exemplary airplane as in FIG. 1 being pitched upward.
Figure 3B:
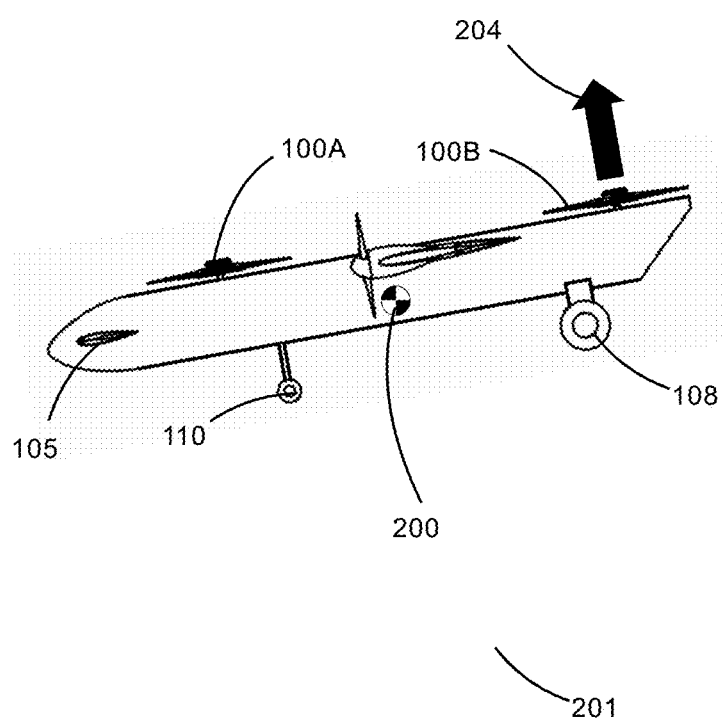
FIG. 3b is a side view showing the exemplary airplane as in FIG. 1 being pitched downward.

As mentioned, the vertical propulsors (100A, 100B) in the present invention can accept either variable or fixed-pitch rotor, however, for mechanical simplicity and to reduce maintenance cost, the rotors of said roto-stabilizers (100A, 100B) are preferably fixed-pitch. The same applies to the horizontal propulsors (102A, 102B). This means that each vertical propulsor (100A, 100B) can only exert aerodynamic force in one direction. FIGS. 3a and 3b illustrate the basic flight control principle of tandem roto-stabilizers. The vertical propulsors (100A, 100B) having fixed-pitch rotors actuate pitch control of the airplane (201) by differential thrust. If the fore unit (100A) of the tandem vertical propulsors (100A, 100B) outputs a greater thrust than the aft unit (100B), then the airplane (201) pitches upwards (203) as depicted in FIG. 3a. Likewise, If the aft unit (100B) of the tandem vertical propulsors (100A, 100B) outputs a greater thrust than the fore unit (100A), then the airplane (201) pitches downwards (204) as depicted in FIG. 3b.

In addition, the tandem vertical propulsors (100A, 100B) can be used to provide partial lift to the airplane (201) during takeoff and landing, helping to reduce forward airspeed, and hence resulting in hyper-short takeoff/landing distance. At certain conditions, vertical takeoff and landing are possible without requiring use of tilt-wings or tilt-rotors.

Figure 4:
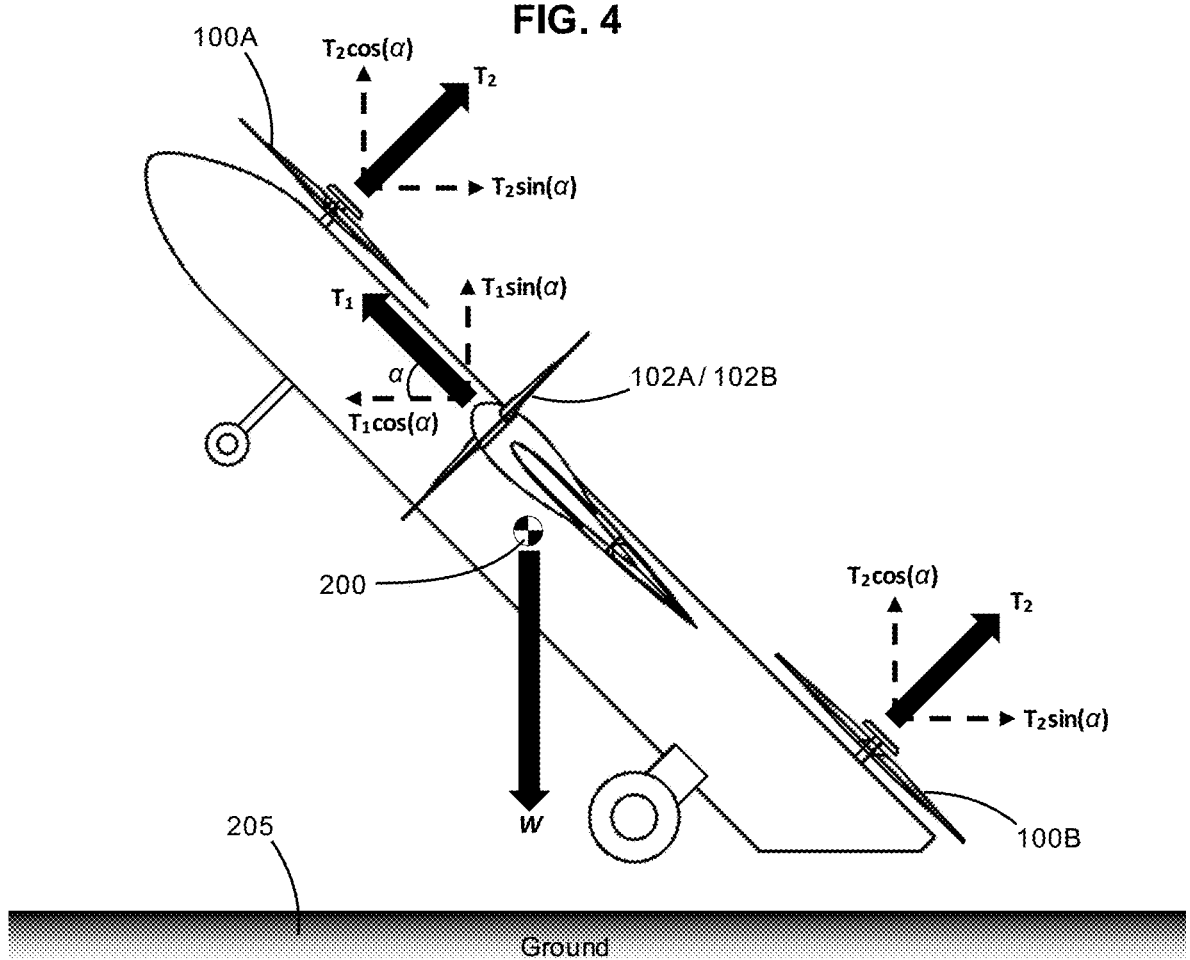
FIG. 4 is a side view showing another embodiment of an exemplary airplane similar to the embodiment shown in FIG. 1, but without any horizontal stabilizer in hovering attitude and the associated forces acting on it.

Referring now to FIG. 4 in order to gain insight into the forces acting on the airplane (201) that make hovering and vertical flight possible from the ground (205). Each of the horizontal propulsors (102A, 102B) generates a thrust $T_1$. Each of the vertical propulsors (100A, 100B) generates a thrust of $T_2$. The airplane (201) has an all-up-weight (AUW) of W. For ease of illustration, let's consider a scenario in which $T_2=T_1$, and the pitch angle, $\alpha$ is +45° to the horizon. Considering the horizontal components of the forces, one obtains $2T_1 \cdot \cos(\alpha) = 2T_2 \sin(\alpha)$. In other words, there is no net horizontal component. Now, considering the vertical components of the forces, one obtains $2T_1 \sin(\alpha) + 2T_2 \cos(\alpha) = W \Rightarrow 1.4142T_1 + 1.4142T_2 = W \Rightarrow 2.8284T_2 = W$, or $T_2$ is approximately equal to 0.35W.

Taken together, the vector analysis shows that when the pitch angle is 45° and when the horizontal propulsors (102A, 102B) and the vertical propulsors (100A, 100B) produce the same amount of thrust, i.e. $T_1 = T_2 = 0.35W$, stationary hover is attained. Additionally, from computer simulations and actual field testing, near seamless transition between forward flight mode and vertical flight mode can be easily achieved.

The vector analysis further suggested that it is possible for the airplane (201) to perform hovering at a less than 45°, but thrust $T_2$ should be greater $T_1$. Results for a of 30° and 20° are as follow:

$\alpha=30°$ $T_1=0.2492W$ $T_2=0.4335W$
$\alpha=20°$ $T_1=0.1708W$ $T_2=0.4699W$ Key advantages of the present invention over the Quad-Planes is that the horizontal propulsors (102A, 102B) contribute to vertical lift generation during vertical flight mode and only a minimum of two vertical propulsors (100A, 100B) are inactive during cruising flight, as opposed to a minimum of four in the case of a QuadPlane.

Figure 5:
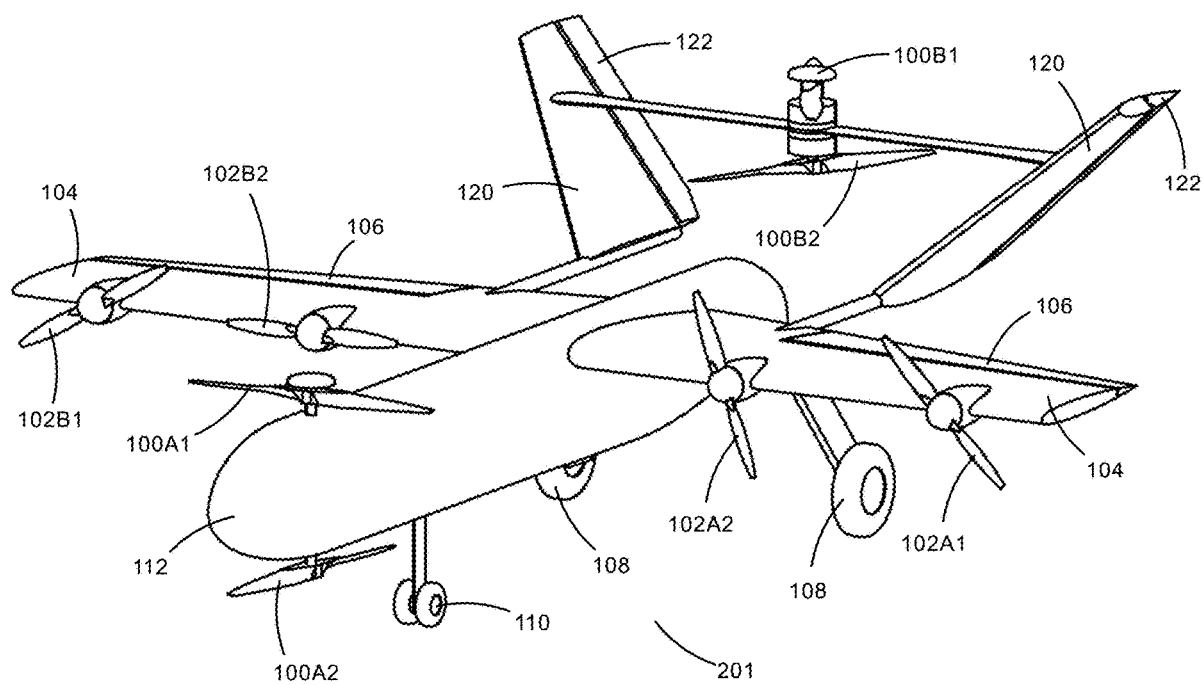
FIG. 5 shows an embodiment of the airplane in the present invention having a V-tail.
Figure 6:
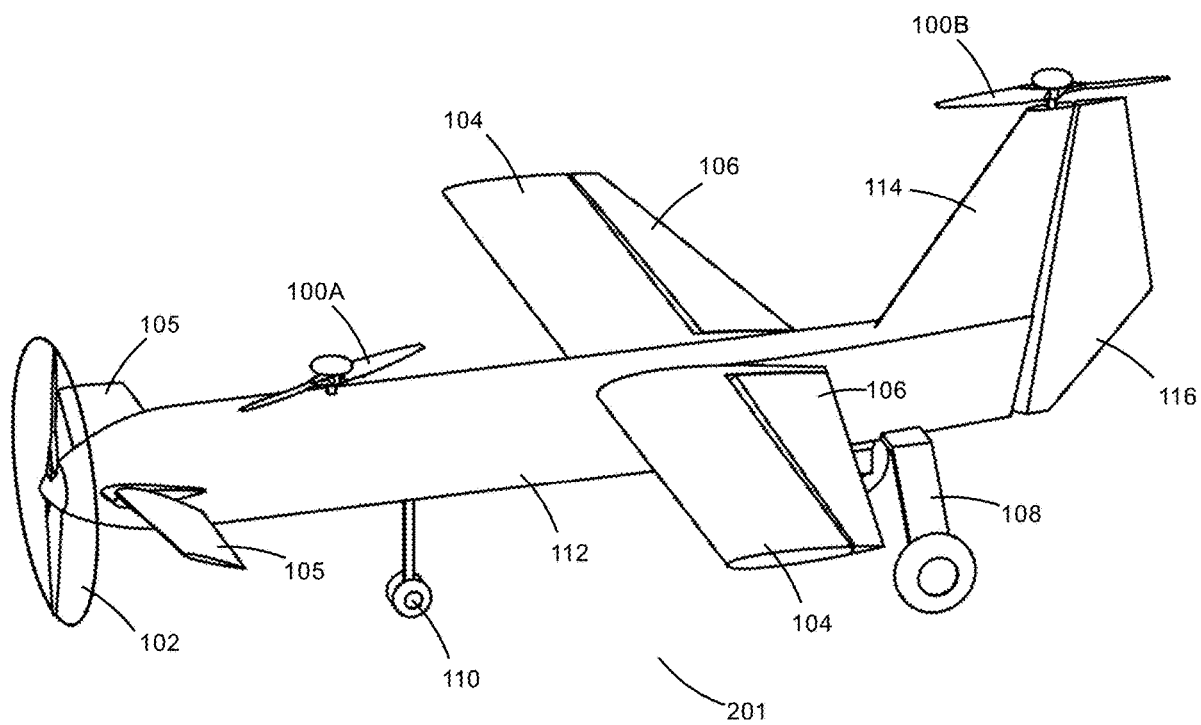
FIG. 6 is a perspective view of an exemplary airplane with a single horizontal propulsor in accordance with the present invention.
Figure 7:
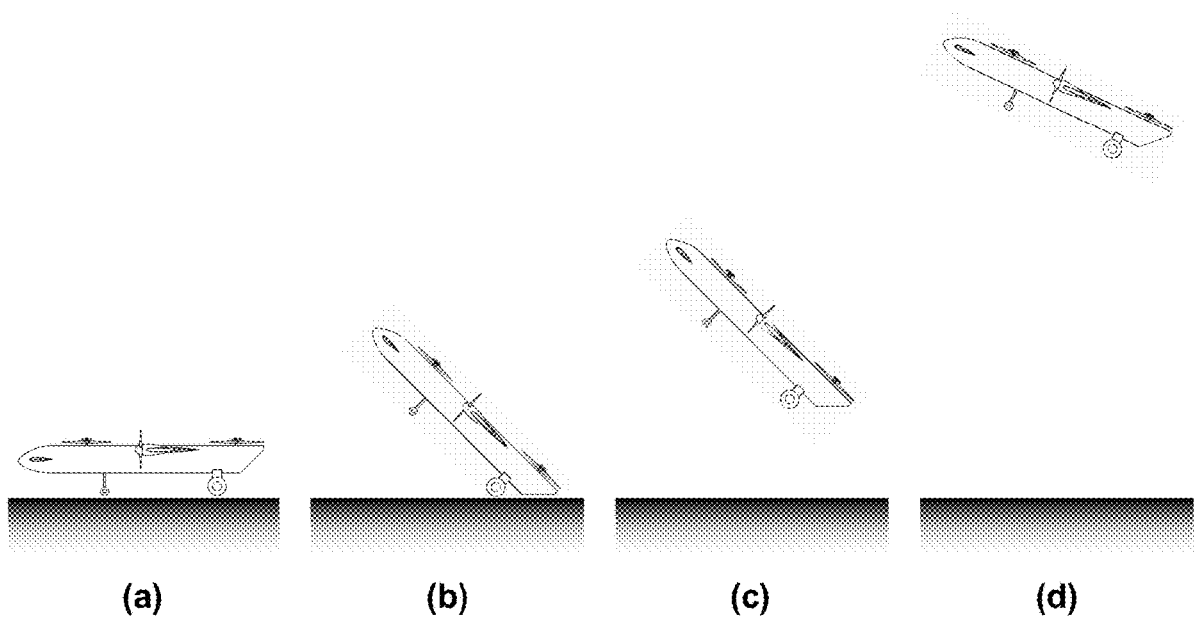
FIG. 7 illustrates a series of side views of the airplane in present invention performing a vertical takeoff wherein said airplane assumes a positive pitch angle attitude.

FIG. 5 shows a perspective view of another embodiment of the airplane (201) in accordance with the present invention wherein the aerodynamic surface for pitch stability and control is a V-tail (120) located towards the rear of the airplane (201). Said airplane (201) comprises two pairs of vertical propulsors (100A1, 100B1, 100A2, 100B2), and two pairs of horizontal propulsors (102A1, 102B1, 102A2, 102B2). The V-tail (120) can be regarded as a combination of horizontal stabilizer (105) and vertical stabilizer (114) and therefore horizontal stabilizer (105) can be eliminated. The presence of additional pairs of propulsors (100A2, 100B2, 102A2, 102B2) is primarily for safety redundancy purpose. Use of a V-tail (120) enables combination of pitch and yaw controls via control surfaces (122). This embodiment may potentially be used for long-endurance flight in that horizontal propulsor pair (102A2, 102B2) may be directly driven by engines running on high energy density fuel such as gasoline or liquid hydrogen and the other propulsors required during VTOL/hyper-STOL would remain as electric powered. Eliminating the need for an onboard electric generator needed to convert chemical energy into electricity to power the horizontal propulsors (102A2, 102B2) would lead to improved energy efficiency and a lower AUW. In other words, a hybrid power plant of electric motors and engines in direct-drive mode for the horizontal propulsors (102A1, 102B1, 102A2, 102B2), may be an almost ideal configuration for long-endurance flights, plus the ability to perform VTOL/hyper-STOL. In accordance with the present invention, each wing (104) may have one or more ailerons (106) for roll control but there should be at least one aileron (106) immersed in strong propeller wash generated by the horizontal propulsors (102A1, 102B1, 102A2, 102B2) to help ensure effective roll control during vertical flight and hovering. The horizontal propulsors (102A, 102B) should be mounted in such a way that would enable said ailerons (106) to be exposed to strong air-stream generated by the horizontal propulsors (102A, 102B) to help ensure adequate roll control in deep wing-stall regimes FIG. 6 shows a perspective view of an embodiment of the airplane (201) in accordance with the present invention. The airplane (201) comprises a fuselage (112), a set of main wings (104) with ailerons (106), at least a pair of vertical propulsors (100A, 100B), at least a horizontal propulsor (102) mounted towards the front end of the airplane (201) which in this case it corresponds to the front end of the fuselage (112), at least a set of main gears (108), at least a nose gear (110), at least a vertical stabilizer (114) with rudder (116) located towards the rear end of the airplane (201), and at least a horizontal stabilizer (105) mounted towards the front end of the airplane (201) but behind the horizontal propulsor (102). This embodiment may be particularly well suited for long-endurance flight wherein the horizontal propulsor (102) may be driven by an engine in direct-drive mode and running on fuels of high specific energy such as gasoline, alcohols or hydrogen. During deep-stall or vertical flight, the pitch control of the airplane (201) will be handled primarily by the vertical propulsors (100A, 100B) via differential thrust while the roll and yaw controls will be handled by the ailerons (106) and rudder(s) (116), respectively. In horizontal flight mode, pitch control will be mainly handled by the horizontal stabilizer(s) (105). Almost the entire horizontal stabilizer(s) (105) can be used as control surface(s) to maximize authority and one of the control surfaces is being deflected 20° for illustration purpose in FIG. 6. The horizontal propulsor (102) may adopt rotor system that is contra-rotating such as those employed in F3A pattern competition to help eliminate spiral slip-stream and P-Factor effects.

FIG. 7 and FIGS. 8a-8d illustrate a series of side views of a typical vertical takeoff sequence with seamless transition to forward flight (using wing-borne lift) in accordance with the present invention. It is being illustrated using the embodiment as presented in FIG. 1 wherein the main landing gears (108) and nose gear (110) are equipped with wheels for ground operation.

Figure 8A:
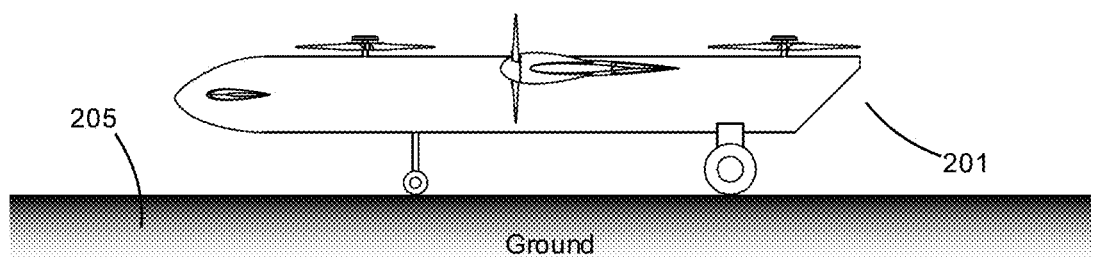
FIGS. 8a-8d illustrates series of enlarged side views of the airplane in present invention performing a vertical takeoff wherein said airplane assumes a positive pitch angle attitude.
Figure 8B:
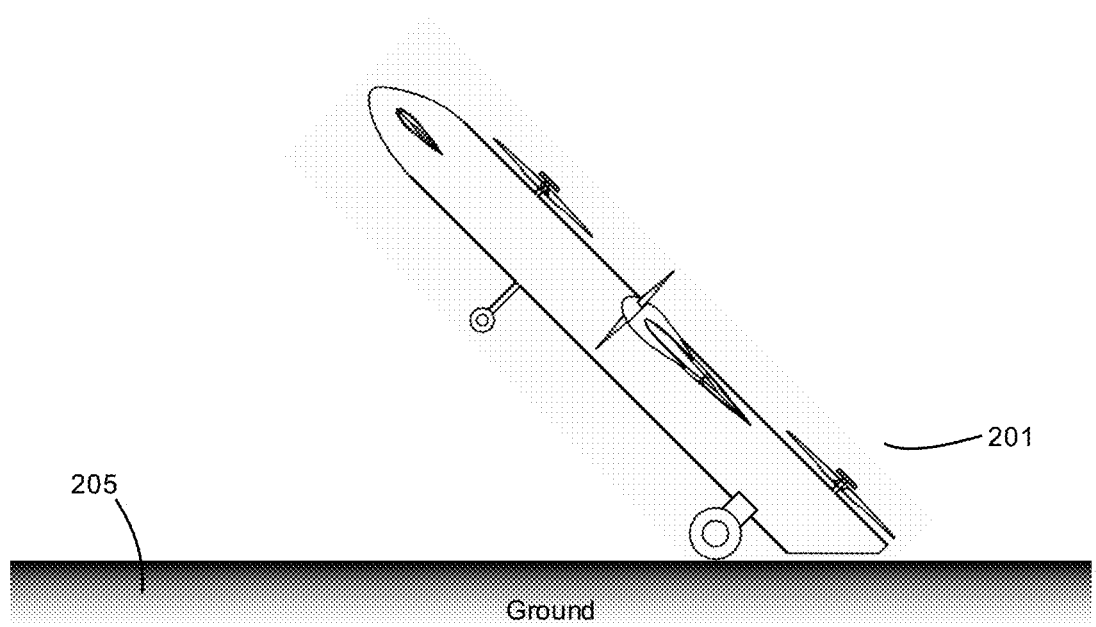
Figure 8C:
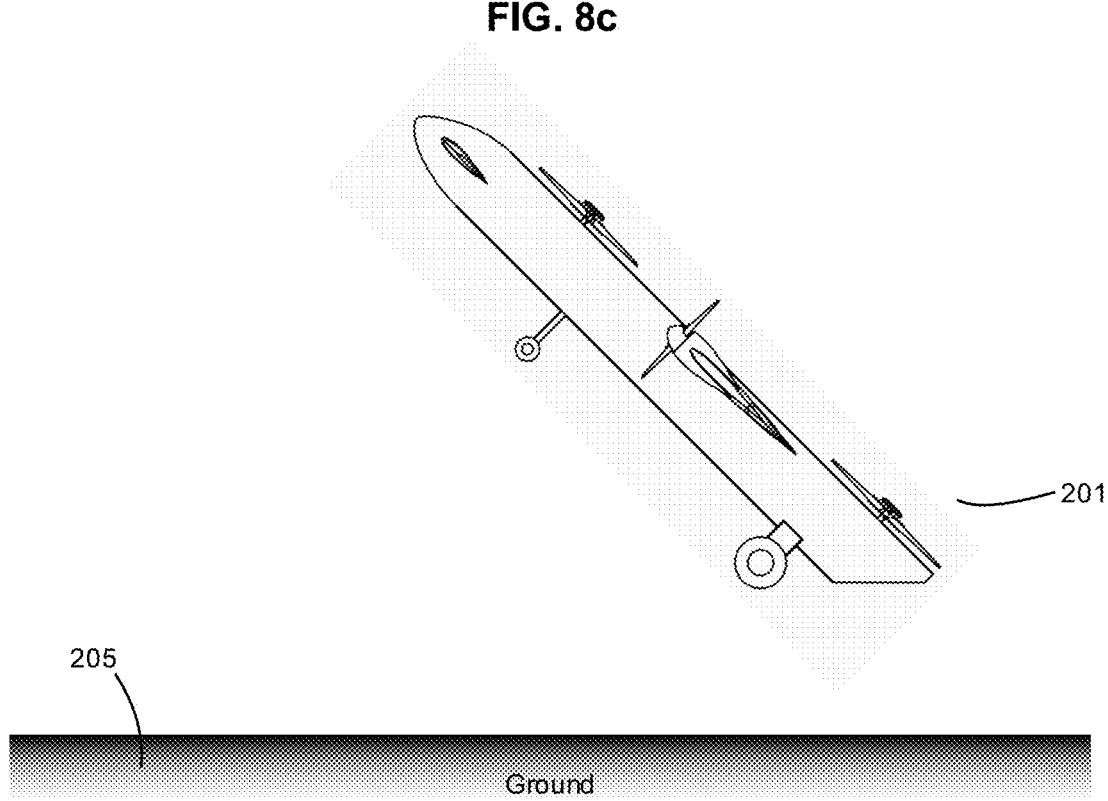
Figure 8D:
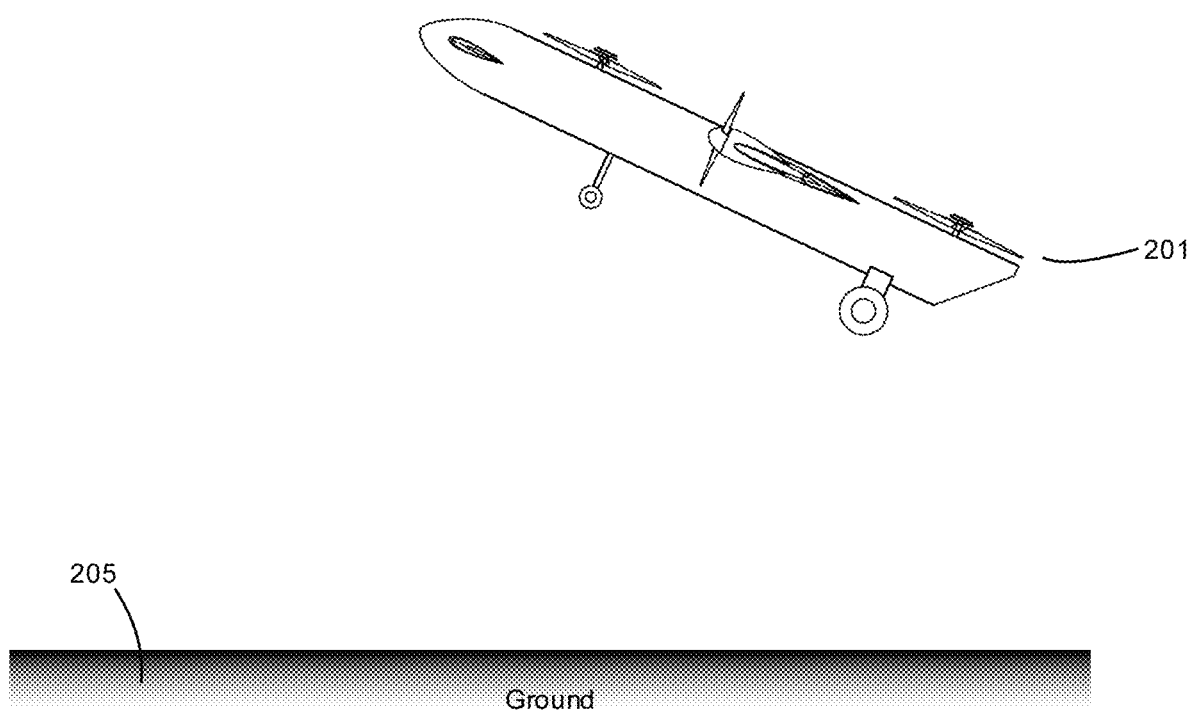

A possible vertical takeoff—forward flight sequence is as follow:
  (a) FIG. 8a illustrates a ramping up the output thrusts of the vertical propulsors (100A, 100B, 100A1, 100B1, 100A2, 100B2). An appropriate rpm is such that the magnitude of the thrust vector is in the range of 0.1W to 0.98W. In presence of headwind, the output thrust(s) of the horizontal propulsor(s) (102, 102A, 102B, 102A1, 102B1, 102A2, 102B2) may be ramped up as well to compensate for the effects of headwind.
  (b) FIG. 8b illustrates raising the airplane's (201) pitch angle by means of differential thrust provided by the vertical propulsors (100A, 100B, 100A1, 100B1, 100A2, 100B2) while simultaneously adjusting the output thrusts of both the vertical propulsors (100A, 100B, 100A1, 100B1, 100A2, 100B2) and the horizontal propulsor(s) (102, 102A, 102B, 102A1, 102B1, 102A2, 102B2) such that their resultant vector is substantially pointing in a vertical direction.
  (c) FIG. 8c illustrates further increasing the total rotor-borne lift to cause the airplane (201) to lift off the ground (205) and entering its vertical flight mode.
  (d) FIG. 8d illustrates lowering the pitch angle of the airplane (201) to initiate forward flight mode.

The steps for transitioning from forward flight mode to vertical landing are:
  (i) gradually increasing the pitch angle of the airplane (201) and increasing rotor-borne lift provided by the vertical propulsors (100A, 100B, 100A1, 100B1, 100A2, 100B2).
  (ii) once the pitch angle has reached a value wherein net horizontal force component is substantially zero and resultant vector is pointing substantially vertical, reducing output power to both the vertical propulsors (100A, 100B, 100A1, 100B1, 100A2, 100B2) and the horizontal propulsor(s) (102, 102A, 102B, 102A1, 102B1, 102A2, 102B2) to initiate vertical descent.
  (iii) when at least a set of main gears (108) is in contact with the ground (205), gradually decreasing pitch angle towards 0° by using differential thrust of the vertical propulsors (100A, 100B, 100A1, 100B1, 100A2, 100B2).
  (iv) Powering off the vertical propulsors (100A, 100B, 100A1, 100B1, 100A2, 100B2) when the nose gear (110) is firmly sitting on the ground (205).

Note that if the resultant vector from the propulsors is slightly pointing towards the front during the takeoff phase, then the vertical takeoff described above essentially becomes hyper-short takeoff.

Figure 9A:
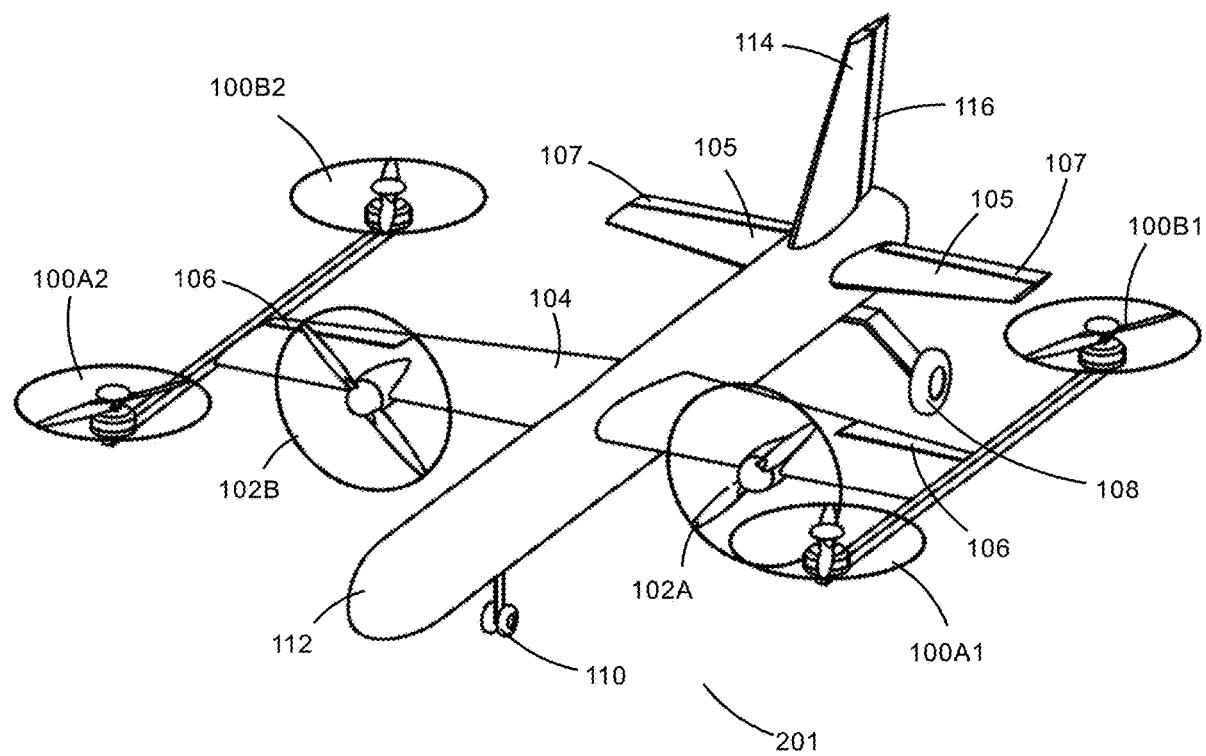
FIG. 9a is a perspective view of an embodiment of the airplane in accordance with the present invention.

FIG. 9a shows a perspective view of yet another embodiment of the airplane (201) in accordance with the present invention. Said airplane (201) comprises a horizontal stabilizer (105) in tail-aft configuration, and the horizontal stabilizer (105) has elevators (107) for aerodynamic pitch control during level flight. Similar to the embodiment shown in FIG. 5, this exemplary airplane (201) comprises four vertical propulsors (100A1, 100A2, 100B1, 100B2) arranged such that they exhibit lateral symmetry except, they are located at a distance away from the longitudinal axis (202) of the airplane [FIG. 9b]. At least a set of main gears (108) may be placed substantially in line with or behind the aft units of the vertical propulsors (100B1, 100B2) to enable a high degree of takeoff rotation such as 45° and preventing rotor of the aft units of the vertical propulsors (100B1, 100B2) from ground strike. In fact, as illustrated in FIG. 9b, the set of main gears (108) is located behind the aft units of the vertical propulsors (100B1, 100B2) and a safety benefit of this arrangement is that as the airplane (201) pitches upward for takeoff, the rotors of the vertical propulsors (100B1, 100B2) move further away from the ground (205) until a certain pitch angle is reached. Conventional airplanes often require that the main gears be placed close to the airplanes' to facilitate rotation during takeoff. Yet, the set of main gears (108) can be placed so far behind the airplane's (201) center of gravity (200) in this invention is because of the uniqueness offered by the tandem roto-stabilizers in that it provides partial lift to the airplane (201), making takeoff rotation possible. This holds true for all embodiments of the present invention. Lift provided by the vertical propulsors (100A, 100B, 100A1, 100A2, 100B1, 100B1) and the horizontal propulsors (102, 102A, 102B, 102A1, 102B1, 102A2, 102B2) also reduces mechanical stress on the set of main gears (108) when the pitch angle is around 45° during takeoff. Another implication is that, the main landing gears (108) and nose gear (110) are not essential for vertical takeoff and landing, and scheme based on "belly landing" is possible especially for light AUW applications such as small unmanned airplanes.

As far as the arrangement of the vertical propulsors is concerned, the design of this embodiment is equivalent to that of a typical QuadPlane and therefore a significance is that the vertical takeoff and landing method proposed in the present invention may be applicable to a QuadPlane to help achieve simpler and seamless transition between vertical and forward flight. Since roll control during slow or vertical flight can be actuated using differential thrust between the vertical propulsors (100A1, 100B1) on the left side of the airplane (201) and the vertical propulsors (100A2, 100B2) on the right side of the airplane (201), it is no longer necessary to have ailerons (106) immersed in strong propeller wash and so the ailerons (106) can be of smaller size. Also, the yaw control during vertical flight arising from differential thrust of the horizontal propulsors (102A, 102B) is expected to be much more authoritative than that of a typical QuadPlane, thereby making it more wind resistance during takeoff and landing.

The foregoing description of the present invention has been presented for purpose of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable other skilled in the art to utilize the invention in such or other embodiments and with various modifications required by the particular application(s) or use(s) of the present invention. It is intended that the appended claims be construed to include alternative embodiments to the extent permitted by the prior art.

REFERENCES

1. M. Francesco (2020) Is the Urban Air Mobility Industry ready for Take-Off? https://www.airborne.com/urban-air-mobility-the-rise-of-evtol-vehicles/2.
2. ArduPilot Dev Team (2019) QuadPlane Overview. https://ardupilot.org/plane/docs/quadplane-overview.html
3. D. Z. Morris (2017) The V-22 Osprey: A Crash Decades in the Making. https://fortune.com/2017/08/05/v22-osprey-crash-australia/4.
4. DeVry University (2020) Drones: Description & Thesis. https://www.coursehero.com/file/p2mea4o/There-are-4-types-of-drones-majorly-used-namely-Fixed-wing-drone-that-has-long/#/doc/qa

What is claimed is:

1. A fixed-wing aircraft capable of forward flight, a substantially vertical takeoff and a substantially vertical landing with non-rotatable vertical propulsions, the aircraft comprising:
    a longitudinal axis;
    a center of gravity;
    an airframe comprising a front section and a back section;
    at least one fore vertical propulsor located on the front section of the airframe;
    at least one aft vertical propulsor located on the back section of the airframe, wherein the fore and aft vertical propulsors are in substantially lateral symmetrical positions about the longitudinal axis of the aircraft;
    at least one horizontal propulsor on the airframe;
    wherein said fixed-wing aircraft is configured to assume a nose-up attitude with a positive pitch angle during hovering in the absence of headwind such that both the horizontal propulsor and the fore and aft vertical propulsors are configured to contribute to lift via resolution of thrust vectors; further wherein the fixed-wing aircraft is configured to attain a stationary hover in the absence of headwind when the thrust of the horizontal propulsor is configured to equal the thrust of the fore and aft vertical propulsors and the pitch angle of the fixed-wing aircraft is substantially equal to forty-five degrees.

2. The fixed-wing aircraft of claim 1, wherein said airframe further comprises a pair of main wings, wherein at least one horizontal propulsor is attached to at least one main wing.

3. The fixed-wing aircraft of claim 1, wherein said airframe further comprises at least a pair of main wings, wherein the pair of main wings are in substantially lateral symmetrical positions about the longitudinal axis of the aircraft, further wherein each main wing comprises at least one aileron, wherein each aileron is immersed in strong propeller wash generated by the horizontal propulsor for roll control during hovering and vertical flight.

4. The fixed-wing aircraft of claim 1, wherein said aircraft further comprises at least one aerodynamic surface for pitch stability and control during horizontal flight.

5. The fixed-wing aircraft of claim 1, wherein said aircraft comprises at least one set of main landing gears located behind the center of gravity of said aircraft, and at least one set of nose gears.

6. The fixed-wing aircraft of claim 1, wherein said airframe further comprises: at least a pair of main wings, wherein the pair of main wings are in substantially lateral symmetrical positions about the longitudinal axis of the aircraft, further wherein at least one horizontal propulsor is mounted proximate to leading edges of the main wings.

7. The fixed-wing aircraft of claim 1, wherein said aircraft further comprises at least one aerodynamic surface for pitch stability and control during horizontal flight, wherein the aerodynamic surface is a horizontal stabilizer.

8. The fixed-wing aircraft of claim 1, wherein said aircraft further comprises at least one aerodynamic surface for pitch stability and control during horizontal flight, wherein the aerodynamic surface is a V-tail.

9. The fixed-wing aircraft of claim 1, wherein said aircraft comprises at least one set of main landing gears located behind the center of gravity of said aircraft, wherein the set of main gears is placed substantially in line with the aft unit vertical propulsor.

10. The fixed-wing aircraft of claim 1, wherein said aircraft comprises at least one set of main landing gears located behind the center of gravity of said aircraft, wherein the set of main gears is located behind the aft unit vertical propulsor.

11. The fixed-wing aircraft of claim 1, wherein said aircraft comprises at least one vertical stabilizer.

12. The fixed-wing aircraft of claim 1, wherein said aircraft comprises at least one vertical stabilizer, wherein at least one aft vertical propulsor is attached to the top of the vertical stabilizer.

13. The fixed-wing aircraft of claim 1, wherein said aircraft comprises at least one vertical stabilizer, wherein the vertical stabilizer further comprises a rudder.

14. The fixed-wing aircraft of claim 1, wherein the airframe of said aircraft comprises at least a fuselage.

15. A method for achieving substantially vertical takeoff, substantially horizontal flight, and substantially vertical landing for a fixed-wing aircraft with non-rotatable vertical propulsions, comprising:
- (a) powering up at least one fore vertical propulsor, at least one aft vertical propulsor, and at least one horizontal propulsor located on an airframe of the aircraft;
- (b) ramping up output thrusts of the fore and aft vertical propulsors;
- (c) ramping up an output thrust of horizontal propulsor to compensate for the effects of headwind;
- (d) raising a pitch angle of the aircraft by differential thrust provided by the vertical propulsors while simultaneously adjusting the output thrusts of both the vertical propulsors and the horizontal propulsor, such that a resultant thrust vector is substantially pointing in a vertical direction;
- (e) increasing the resultant thrust vector to cause the aircraft to lift off the ground and enter a vertical flight mode, wherein the fixed-wing aircraft attains a stationary hover when the thrust of the horizontal propulsor equals the thrust of the fore and aft vertical propulsors and the pitch angle of the fixed-wing aircraft is substantially equal to forty-five degrees;
- (f) lowering the pitch angle of the aircraft to initiate a forward flight mode;
- (g) increasing the pitch angle of the aircraft and increasing vertical lift provided by the vertical propulsors to transition from forward flight mode to a vertical landing mode, until the pitch angle has reached a value wherein a net horizontal force component is substantially zero and a resultant thrust vector is pointing in a substantially vertical direction;
- (h) reducing output power to both the vertical propulsors and the horizontal propulsor to initiate vertical descent; and
- (i) decreasing the pitch angle towards zero degree by using differential thrust of the vertical propulsors until a set of main gears is in contact with the ground and the aircraft has landed.

16. A method for achieving substantially vertical takeoff, substantially horizontal flight, and substantially vertical landing for a fixed-wing aircraft with non-rotatable vertical propulsions, comprising:
- (a) powering up at least one fore vertical propulsor, at least one aft vertical propulsor, and at least two horizontal propulsors located on pair of main wings attached to an airframe of the aircraft;
- (b) ramping up output thrusts of the fore and aft vertical propulsors;
- (c) ramping up an output thrust of horizontal propulsors to compensate for the effects of headwind;
- (d) raising a pitch angle of the aircraft by differential thrust provided by the vertical propulsors while simultaneously adjusting the output thrusts of both the vertical propulsors and the horizontal propulsors, such that a resultant thrust vector is substantially pointing in a vertical direction;
- (e) increasing the resultant thrust vector to cause the aircraft to lift off the ground and enter a vertical flight mode, wherein the fixed-wing aircraft attains a stationary hover when the thrust of the horizontal propulsor equals the thrust of the fore and aft vertical propulsors and the pitch angle of the fixed-wing aircraft is substantially equal to forty-five degrees;
- (f) lowering the pitch angle of the aircraft to initiate a forward flight mode;
- (g) increasing the pitch angle of the aircraft and increasing vertical lift provided by the vertical propulsors to transition from forward flight mode to a vertical landing mode, until the pitch angle has reached a value wherein a net horizontal force component is substantially zero and a resultant thrust vector is pointing in a substantially vertical direction;
- (h) reducing output power to both the vertical propulsors and the horizontal propulsors to initiate vertical descent; and
- (i) decreasing the pitch angle towards zero degree by using differential thrust of the vertical propulsors until a set of main gears is in contact with the ground and the aircraft has landed.

\* \* \* \* \*